(12) United States Patent
Kokkonen

(10) Patent No.: US 9,728,959 B2
(45) Date of Patent: Aug. 8, 2017

(54) METHOD FOR OPERATING AN INVERTER AND AN INVERTER

(71) Applicant: ABB OY, Helsinki (FI)

(72) Inventor: Jesse Kokkonen, Klaukkala (FI)

(73) Assignee: ABB Oy, Helsinki (FI)

( * ) Notice: Subject to any disclaimer, the term of this patent is extended or adjusted under 35 U.S.C. 154(b) by 842 days.

(21) Appl. No.: 14/092,189

(22) Filed: Nov. 27, 2013

(65) Prior Publication Data

US 2014/0145505 A1    May 29, 2014

(30) Foreign Application Priority Data

Nov. 28, 2012  (EP) .................................... 12194533

(51) Int. Cl.
*H02J 3/00* (2006.01)
*H02M 1/36* (2007.01)
*H02M 7/48* (2007.01)

(52) U.S. Cl.
CPC .................. *H02J 3/00* (2013.01); *H02M 1/36* (2013.01); *H02M 7/48* (2013.01); *Y02E 10/56* (2013.01); *Y10T 307/549* (2015.04)

(58) Field of Classification Search
CPC ............... H02J 3/00; H02M 1/36; H02M 7/48
See application file for complete search history.

(56) References Cited

U.S. PATENT DOCUMENTS

| 8,988,900 | B2 * | 3/2015 | Toliyat | H02M 5/4585 |
| | | | | 363/17 |
| 2008/0094867 | A1 * | 4/2008 | Muller | H02H 7/1222 |
| | | | | 363/56.05 |
| 2010/0124087 | A1 | 5/2010 | Falk | |
| 2011/0194216 | A1 | 8/2011 | Schaub et al. | |

FOREIGN PATENT DOCUMENTS

| CN | 201789306 U | 4/2011 |
| CN | 201846251 U | 5/2011 |
| CN | 102480132 A | 5/2012 |
| DE | 10 2008 050543 A1 | 4/2010 |
| EP | 1 914 857 A1 | 4/2008 |
| EP | 2 187 510 A1 | 5/2010 |

OTHER PUBLICATIONS

European Search Report for EP 12194533.1 dated Mar. 26, 2013.
(Continued)

*Primary Examiner* — Jared Fureman
*Assistant Examiner* — Rafael Pacheco
(74) *Attorney, Agent, or Firm* — Taft Stettinius & Hollister LLP

(57) ABSTRACT

A method for operating an inverter, and an inverter for coupling with a photovoltaic array having at least one photovoltaic panel are disclosed. The inverter can be configured: to connect output poles of the photovoltaic array in short circuit with each other; to measure a current supplied by the photovoltaic array through the output poles after they have been connected in short circuit with each other; and to start a DC-to-AC conversion of power supplied by the photovoltaic array if the measured current exceeds a predetermined threshold.

13 Claims, 1 Drawing Sheet

(56) References Cited

OTHER PUBLICATIONS

Office Action (First) and Search Report issued on Oct. 9, 2015, by the State Intellectual Property Office of the People's Republic of China in corresponding Chinese Patent Application No. 201310625302.3 and an English translation of the Office Action (11 pgs).
English Translation of Chinese Office Action; Chinese Patent Office; Chinese Patent Application No. 201310625302.3; Dated Jul. 28, 2016; 10 pgs.
Chinese Office Action; Chinese Patent Office; Chinese Patent Application No. 201310625302.3; Dated Jul. 28, 2016; 10 pgs.

* cited by examiner

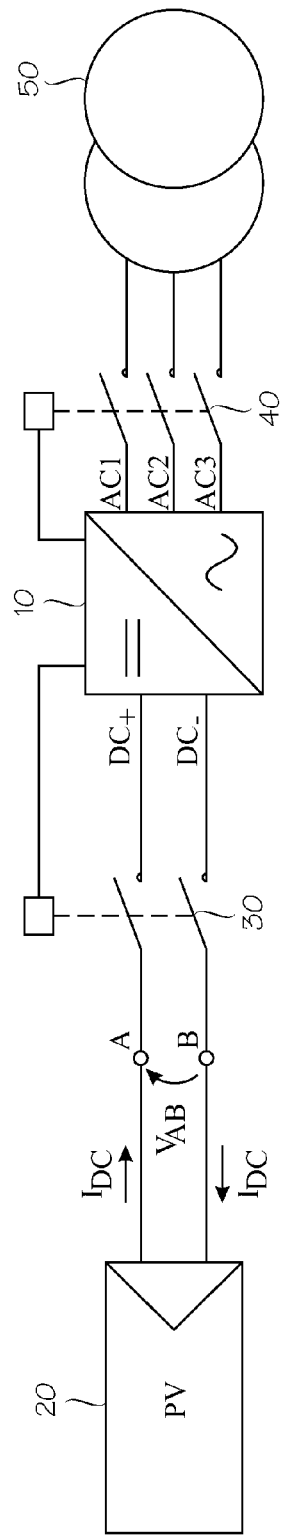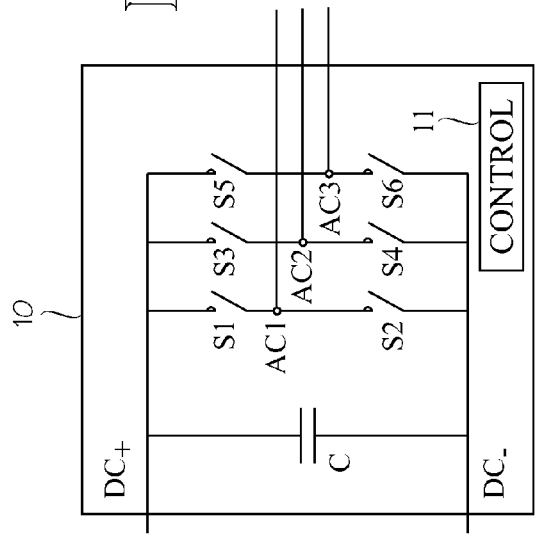

METHOD FOR OPERATING AN INVERTER AND AN INVERTER

RELATED APPLICATIONS

This application claims priority under 35 U.S.C. §119 to European Patent Application No. 12194533.1 filed in Europe on Nov. 28, 2012, the entire content of which is hereby incorporated by reference in its entirety.

FIELD

The present disclosure relates to a method for operating an inverter, and to an inverter.

BACKGROUND INFORMATION

An inverter is an electrical device enabling generation of a voltage with a variable frequency. One example of an inverter is a converter bridge implemented by IGB transistors (IGBT, Insulated-Gate Bipolar Transistor) or other power semiconductor switches. Inverters may be used in connection with photovoltaic (PV) applications where the inverter converts the DC voltage produced by one or more photovoltaic panels to an AC voltage and feeds it to an AC supply network; e.g., the inverter generates an AC voltage with a frequency that corresponds to the frequency of the AC supply network. Such an inverter may be called a solar inverter.

A solar inverter may start the DC-to-AC conversion of power supplied by the photovoltaic panel(s) on the basis of an open-circuit voltage supplied by the photovoltaic panel(s). The term open-circuit voltage refers to a voltage between the two output terminals of the photovoltaic panel(s) when there is no external load connected to the output terminals and thus when essentially no current flows through the output terminals. The conversion operation in the inverter may start if the determined open-circuit voltage exceeds a set reference value and after a possible predetermined delay set for the start.

The above way of starting the DC-to-AC conversion does not necessarily enable an accurate determination of an optimal starting moment because the open-circuit voltage of a photovoltaic panel may reach its maximum value at such a low level of current output capacity that it is not feasible to start the DC-to-AC conversion. By using starting delays it is possible to try to better adjust the starting moment to an optimal one but because of changing conditions, such as temperature or snow load on top of the photovoltaic panel, it may be difficult to keep the starting moment optimal.

For example, it is possible that there is some snow on top of the photovoltaic panel such that the open-circuit voltage of the photovoltaic panel does reach a sufficient level to trigger the start of the DC-to-AC conversion but still the current output capacity of the photovoltaic panel is not yet sufficient. As a result, the solar inverter may unnecessarily keep starting and stopping the DC-to-AC conversion, which wastes energy and may be detrimental to the solar inverter in the long run.

SUMMARY

A method is disclosed for starting a DC-to-AC conversion of power by an inverter coupled with a photovoltaic array having at least one photovoltaic panel, wherein the method comprises: a) connecting, by the inverter, output poles of the photovoltaic array in short circuit with each other, the connecting including switching in the inverter switches of at least one switching branch into a conducting state; b) measuring, by the inverter, a current supplied by the photovoltaic array through the output poles after they have been connected in short circuit with each other; and c) starting, in the inverter, a DC-to-AC conversion of power supplied by the photovoltaic array if the measured current exceeds a predetermined threshold.

An inverter is disclosed comprising: means for coupling the inverter with a photovoltaic array having at least one photovoltaic panel; means configured to connect output poles of the photovoltaic array in short circuit with each other by switching inverter switches of at least one switching branch into a conducting state; means configured to measure a current supplied by the photovoltaic array through the output poles after they have been connected in short circuit with each other; and means configured to start a DC-to-AC conversion of power supplied by the photovoltaic array if the measured current exceeds a predetermined threshold.

An inverter coupled with a photovoltaic array having at least one photovoltaic panel is disclosed, wherein the inverter comprises: switches for connecting output poles of the photovoltaic array in short circuit with each other by switching at least one switching branch of the inverter into a conducting state; means for measuring a current supplied by the photovoltaic array through the output poles after they have been connected in short circuit with each other; and a DC-to-AC convertor for converting power supplied by the photovoltaic array if measured current exceeds a predetermined threshold.

BRIEF DESCRIPTION OF THE FIGURES

In the following, the invention will be described in more detail in connection with exemplary embodiments and with reference to the accompanying drawings, in which:

FIG. 1 illustrates an example of a photovoltaic system according to an embodiment disclosed herein; and FIG. 2 illustrates an example of an inverter according to an embodiment disclosed herein.

DETAILED DESCRIPTION

An exemplary method, computer program product, and inverter are disclosed which are based on the idea of connecting, by an inverter, output poles of a photovoltaic array in short circuit, measuring by the inverter a short circuit current supplied by the photovoltaic array, and starting in the inverter a DC-to-AC conversion if the measured short circuit current supplied by the photovoltaic array exceeds a predetermined threshold.

An exemplary advantage of embodiments disclosed herein is that the starting of the DC-to-AC conversion in the inverter can be better optimized to the correct moment and therefore the inverter does not unnecessarily run idle or does not start the DC-to-AC conversion too late.

The application of features disclosed herein is not limited to any specific system, but can be used in connection with various electric systems. Moreover, the use of exemplary embodiments disclosed herein is not limited to systems employing any specific fundamental frequency or any specific voltage level.

FIG. 1 illustrates a simplified example of a photovoltaic system. The figure shows only components necessary for understanding the illustrated embodiment of the invention.

The exemplary system of FIG. 1 includes an inverter 10 coupled with a photovoltaic (PV) array 20 having at least one photovoltaic panel. If the photovoltaic array 20 includes more than one photovoltaic panel, the photovoltaic panels may be connected in series and/or in parallel to obtain a desired output voltage and current.

The photovoltaic array 20 includes two output poles A, B which have been connected to DC input poles DC+, DC− of the inverter 10. The inverter 10 may be coupled to the photovoltaic array 20 via one or more switches 30 which enable the inverter 10 to be electrically connected to and disconnected from the photovoltaic array 20. The switch(es) 30 may be manually controlled or electronically controlled as the switch 30 in the example of FIG. 1, which may be controlled by the inverter 10.

The inverter 10 is further coupled to a three-phase AC power network 50 through three AC output poles AC1, AC2, AC3. Again, the inverter 10 may be coupled with the AC power network 50 via one or more switches 40 which enable the inverter 10 to be electrically connected to and disconnected from the AC power network 50.

The switch(es) 40 may be manually controlled or electronically controlled as the switch 40 in the example of FIG. 1, which may be controlled by the inverter 10. All or some of the external switches 30, 40 shown in FIG. 1 could also be internal switches inside the inverter 10.

The photovoltaic system may further include additional components such as filters and fuses which have not been shown for the sake of clarity.

FIG. 2 illustrates an example of an inverter 10. The exemplary inverter 10 is a three-phase inverter and includes three switching branches.

The first switching branch includes semiconductor switches S1 and S2, the second switching branch includes semiconductor switches S3 and S4, and the third switching branch includes semiconductor switches S5 and S6. The semiconductor switches S1 to S6 may be IGB transistors or other power semiconductor switches, for example.

The exemplary inverter 10 further includes a DC part illustrated with a capacitance C which may contain one or more capacitors. The exemplary inverter 10 further includes a control unit 11 which controls the operation of the inverter 10. The control unit 11 can, for example, also control operation of the external switches 30, 40. For the sake of clarity, no internal control connections between the control unit 11 and other components of the inverter 10, such as the semiconductor switches S1 to S6, are shown in the figure. The control unit 11 may include one or more physical units.

According to an exemplary embodiment, the inverter can be operated as follows: first the output poles A, B of the photovoltaic array 20 are connected in short circuit with each other by the inverter 10. This can be performed by switching in the inverter 10 switches of at least one switching branch into a conducting state. That is, at least switches S1 and S2, or switches S3 and S4, or switches S5 and S6 are switched into a conducting state.

It is also possible to switch switches of more than one switching branch into a conducting state. Before switching the switches of the at least one switching branch into the conducting state it may be checked that the capacitance C of the inverter 10 is not charged. If the capacitance C of the inverter 10 is charged then, for example, it can be discharged before switching the switches of the at least one switching branch into the conducting state.

If the inverter 10 is electrically connected to the AC network 50, the inverter 10 is, for example, disconnected from the AC network 50 before switching the switches of the at least one switching branch into the conducting state. This can be performed by the switch 40 via which the inverter 10 is coupled with the AC power network 50 by switching the switch 40 into a non-conducting state.

When the inverter 10 is coupled with the photovoltaic array 20 via at least one switch 30, the at least one switch 30 is switched into a conducting state. This is, for example, performed after switching the switches of the at least one switching branch into the conducting state.

Then, after the output poles A, B of the photovoltaic array 20 have been connected in short circuit with each other, a current $I_{DC}$ supplied by the photovoltaic array through the output poles A, B is measured by the inverter 10. If the measured current exceeds a predetermined threshold, a DC-to-AC conversion of power supplied by the photovoltaic array 20 is started in the inverter 10. The predetermined current threshold depends on the system properties but may be, for example, 1% to 2% of the nominal current.

The starting of the DC-to-AC conversion in the inverter 10 can include, for example, first removing the short circuit of the output poles A, B of the photovoltaic array 20 and then starting to normally convert the DC voltage produced by the photovoltaic array 20 to an AC voltage and feed it to the AC power network 50.

According to an exemplary embodiment, if the measured current does not exceed the predetermined threshold, it is possible to sustain the short circuit of the output poles A, B of the photovoltaic array 20 until the current exceeds the predetermined threshold. Alternatively, it is possible to periodically check the current (e.g., by periodically switching the switch 30 between the inverter 10 and the photovoltaic array 20 into a conducting and non-conducting state).

According to an exemplary embodiment, it is possible first to measure by the inverter 10 an open-circuit voltage $V_{AB}$ supplied by the photovoltaic array 20 and perform the measurement of the short circuit current supplied by the photovoltaic array 20 as described herein only when the measured open-circuit voltage exceeds a predetermined threshold. This kind of preliminary voltage check may be used to determine whether the photovoltaic array 20 is, even in principle, able to provide a sufficient current and thus to avoid unnecessary short circuit current measurements.

It is also possible to perform such open-circuit voltage check during the periodic short circuit current measurements and, if the measured open-circuit voltage is below the predetermined threshold, then stop the periodic short circuit current measurements until the open-circuit voltage again exceeds the predetermined threshold.

The control unit 11 or other control means controlling the inverter 10 according to any of the exemplary embodiments described herein, or a combination thereof, may be implemented as one unit or as two or more separate physical units that are configured to implement the functionality of the various embodiments. Herein the term 'unit' generally refers to a physical or logical entity, such as a physical device or a part thereof or a software routine.

The control unit 10 according to exemplary embodiments disclosed herein may be implemented at least partly by means of one or more computers or corresponding digital signal processing (DSP) equipment provided with suitable software, for example. Such a computer or digital signal processing equipment can, for example, include at least a working memory (RAM) providing storage area for arithmetical operations, and a central processing unit (CPU), such as a general-purpose digital signal processor specially programmed to perform the functions described herein.

The CPU may include a set of registers, an arithmetic logic unit, and a control unit. The CPU control unit can be controlled by a sequence of program instructions transferred to the CPU from the RAM. The CPU control unit may contain a number of microinstructions for basic operations. The implementation of microinstructions may vary depending on the CPU design.

The program instructions may be coded by a programming language, which may be a high-level programming language, such as C, Java, etc., or a low-level programming language, such as a machine language, or an assembler.

The computer may also have an operating system which may provide system services to a computer program written with the program instructions. The computer or other apparatus implementing the exemplary embodiment, or a part thereof, may further include suitable input means for receiving, for example, measurement and/or control data; and output means for outputting, for example, control data.

It is also possible to use a specific integrated circuit or circuits, or discrete electric components and devices for implementing the functionality according to any of the exemplary embodiments.

Exemplary embodiments disclosed herein can be implemented in existing inverters. Present inverters can, for example, include processors and memory that can be utilized in the functions according to the various embodiments described herein. Presently existing inverters can also readily include means for measuring DC current and DC voltage, thus enabling them to determine the short circuit current and open-circuit voltage of the photovoltaic array 20 as disclosed herein without any additional measuring equipment.

Thus, all modifications and configurations for implementing an exemplary embodiment in existing inverters may be performed as software routines, which may be implemented as added or updated software routines. If at least part of the functionality of an exemplary embodiment disclosed herein is implemented by software, such software can be provided as a computer program product including computer program code which, when run on a computer, causes the computer or corresponding arrangement to perform the functionality as described herein. Such computer program code may be stored or generally embodied on a computer readable medium, such as suitable memory (e.g., a flash memory or an optical memory), from which it is loadable to the unit or units executing the program code.

In addition, such a computer program code implementing an exemplary embodiment disclosed herein may be loaded to the unit or units executing the computer program code via a suitable data network, for example, and it may replace or update a possibly existing program code.

It will be apparent to a person skilled in the art that as technology advances, basic ideas of the invention as disclosed herein can be implemented in a variety of ways. Consequently, the invention and its embodiments are not restricted to the above examples, but can vary within the scope of the claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for starting a DC-to-AC conversion of power by an inverter coupled with a photovoltaic array having at least one photovoltaic panel, wherein the method comprises:
   a) connecting, by the inverter, output poles of the photovoltaic array in short circuit with each other, the connecting including switching inverter switches of at least one switching branch into a conducting state;
   b) measuring, by the inverter, a current supplied by the photovoltaic array through the output poles after they have been connected in short circuit with each other; and
   c) starting, in the inverter, a DC-to-AC conversion by switching the inverter switches of power supplied by the photovoltaic array if the measured current exceeds a predetermined threshold.

2. The method of claim 1, wherein the inverter is coupled with the photovoltaic array via at least one switch, wherein step a) comprises:
   switching said at least one switch into a conducting state.

3. The method of claim 2, wherein the method comprises:
   measuring, by the inverter, an open-circuit voltage supplied by the photovoltaic array; and
   performing steps a) to c) only when the measured open-circuit voltage exceeds a predetermined threshold.

4. The method of claim 1, wherein the method comprises:
   measuring, by the inverter, an open-circuit voltage supplied by the photovoltaic array; and
   performing steps a) to c) only when the measured open-circuit voltage exceeds a predetermined threshold.

5. A computer program product comprising computer program code embodied on a non-transitory computer readable medium, wherein execution of the program code in a computer causes the computer to control an inverter to carry out the method according to claim 1.

6. An inverter comprising:
   means for coupling the inverter with a photovoltaic array having at least one photovoltaic panel;
   means configured to connect output poles of the photovoltaic array in short circuit with each other by switching inverter switches of at least one switching branch into a conducting state;
   means configured to measure a current supplied by the photovoltaic array through the output poles after they have been connected in short circuit with each other; and
   means configured to start a DC-to-AC conversion by switching the inverter switches of power supplied by the photovoltaic array if the measured current exceeds a predetermined threshold.

7. The inverter of claim 6, wherein the inverter is coupled with the photovoltaic array via at least one switch, wherein the means configured to connect the output poles of the photovoltaic array in short circuit with each other are configured to switch said at least one switch into a conducting state.

8. The inverter of claim 7, comprising:
   means configured to measure an open-circuit voltage supplied by the photovoltaic array;
   wherein the means configured to connect the output poles of the photovoltaic array in short circuit with each other are configured to operate only when the measured open-circuit voltage exceeds a predetermined threshold.

9. The inverter of claim 7, wherein the inverter is a three-phase inverter comprising:
   three switching branches.

10. The inverter of claim 6, comprising:
   means configured to measure an open-circuit voltage supplied by the photovoltaic array;
   wherein the means configured to connect the output poles of the photovoltaic array in short circuit with each other are configured to operate only when the measured open-circuit voltage exceeds a predetermined threshold.

11. The inverter of claim 6, wherein the inverter is a three-phase inverter comprising:
   three switching branches.

12. An inverter coupled with a photovoltaic array having at least one photovoltaic panel, wherein the inverter comprises:
   inverter switches for connecting output poles of the photovoltaic array in short circuit with each other when switching at least one switching branch of the inverter into a conducting state;
   means for measuring a current supplied by the photovoltaic array through the output poles when they have been connected in short circuit with each other; and
   a DC-to-AC convertor for converting by switching the inverter switches power supplied by the photovoltaic array if measured current exceeds a predetermined threshold.

13. An inverter coupled with a photovoltaic array comprising at least one photovoltaic panel, wherein the inverter is configured to:
   connect output poles of the photovoltaic array in short circuit with each other by switching inverter switches of at least one switching branch of the inverter into a conducting state;
   measure a current supplied by the photovoltaic array through the output poles after they have been connected in short circuit with each other; and
   start a DC-to-AC conversion by switching the inverter switches of power supplied by the photovoltaic array if the measured current exceeds a predetermined threshold.

* * * * *